United States Patent
Johnson, Jr. et al.

[15] 3,654,464
[45] Apr. 4, 1972

[54] RESONANT SCATTERING OF GAMMA RAYS AS SELECTIVE MEANS FOR DETERMINING AN ELEMENT OF INTEREST

[72] Inventors: Walter H. Johnson, Jr., Cambridge, Mass.; William C. Pritchett, Dallas, Tex.

[73] Assignee: Atlantic Richfield Company, Philadelphia, Pa.

[22] Filed: Jan. 22, 1970

[21] Appl. No.: 6,021

Related U.S. Application Data

[63] Continuation of Ser. No. 591,543, Nov. 11, 1966, abandoned.

[52] U.S. Cl.................250/71.5 R, 250/83.3 R, 250/83.6 W
[51] Int. Cl..........................................................G01t 1/20
[58] Field of Search...........................250/83.3, 83.6 W, 71.5

[56] References Cited

UNITED STATES PATENTS 2,949,535  8/1960  Scherbatskoy...............250/83.6 W X
3,508,052  4/1970  Seevers.......................250/83.6 W X Primary Examiner—James W. Lawrence
Assistant Examiner—Morton J. Frome
Attorney—Norbert E. Birch and Blucher S. Tharp

[57] ABSTRACT

A radioactive logging method and apparatus for quantitatively determining an element of interest in subsurface formations traversed by a borehole. Earth formations are bombarded with fast neutrons causing the various elements to emit characteristic gamma rays. These gammas strike resonant scatter material which is specially selected to elastically scatter only those gammas derived from the element of interest. The scattered gammas thus obtained are detected with a scintillator and a photomultiplier.

3 Claims, 5 Drawing Figures

RESONANT SCATTERING OF GAMMA RAYS AS SELECTIVE MEANS FOR DETERMINING AN ELEMENT OF INTEREST

This is a continuation of application Ser. No. 591,543 filed Nov. 11, 1966 and now abandoned.

The present invention relates to a new radioactive logging technique for elemental analysis. More particularly, the invention concerns methods and apparatus involving nuclear resonant scattering for determining an element of interest in subsurface formations penetrated by a borehole.

A nucleus may contain only discrete amounts of energy and is thus said to exist in one of several possible energy states. When the nucleus absorbs a neutron, it becomes excited and occupies a higher energy state. The nucleus may then decay to the ground state in a single energy transition or in a cascade of transitions through successively lower energy states. Transition between two states is accompanied by the emission of gamma rays and recoil of the nucleus. Since the energy states are characteristic of a particular nucleus, so also are the emitted gamma rays.

It is an object of the present invention to provide a method and apparatus for determining an element of interest in the presence of many other elements by selectively detecting the gamma rays emitted thereby.

Another object of the invention is to provide a method and apparatus for radioactive logging whereby gamma rays of preselected energy can be detected to the exclusion of gamma rays emitted by other elements.

Other objects will be obvious to those skilled in the art and will in part appear hereinafter.

The invention comprises the application of nuclear resonant scattering to borehole logging of subsurface formations. Nuclear resonant scattering is the process by which a gamma ray may be absorbed and then re-emitted with essentially the same energy (differing only by the recoil energy of the nucleus). For a given gamma ray, this effect will occur only if the resonant scattering nucleus or target nucleus has certain critical energy levels with respect to the energy of the gamma ray. Accordingly, the resonant scatterer is selected so that it will have a high cross section for resonantly scattering the preselected gamma ray while having essentially zero cross section for resonantly scattering gamma rays of other energies.

The selectivity of the method depends on the energy discrimination of the resonant scattering process. The resonant scatter material has a characteristic window or energy band of inherent width, i.e., uncertainty in energy due to the average time its nuclei spend in the excited state before decaying. The scattering cross section is extremely large for a gamma ray whose energy falls in the narrow scatter window and is negligible in all other instances. Hence, the resonant scattering process is most selective, occurring only for gamma rays whose energies fall within a window of a few electron volts out of a total energy spectrum of several million electron volts.

For a fuller understanding of the nature of the invention reference should be made to the accompanying drawings, in which:

FIG. 1 is a representation in longitudinal section showing a logging tool embodying the invention traversing a borehole.

FIG. 2a plots probability distribution against energy for a typical scattering reaction.

FIG. 2b plots probability distribution against energy for the same scattering reaction when the resonant scatter material is rapidly rotated.

Figure 1:
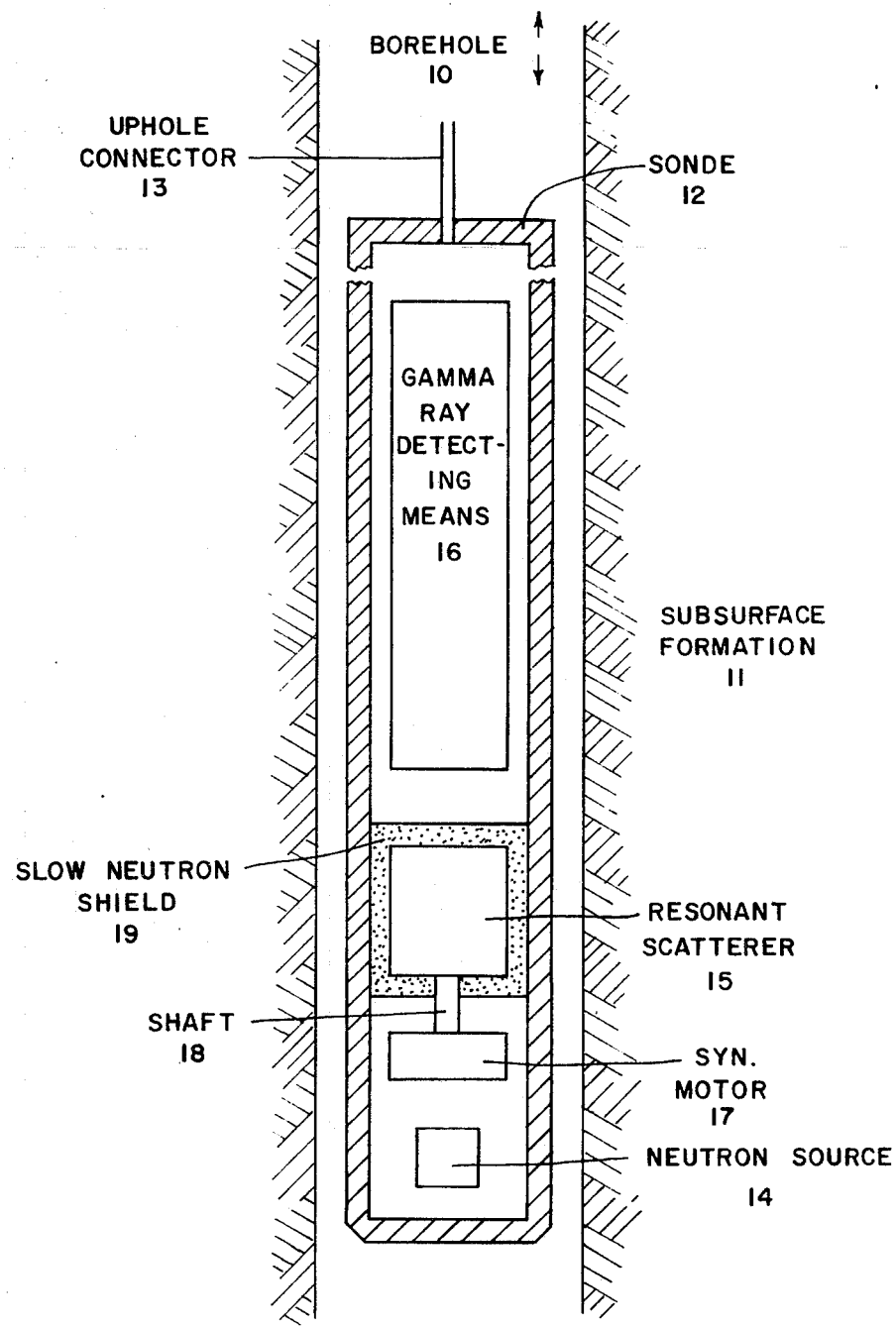

The basic principles of the invention will be apparent in reference to FIG. 1. Borehole 10 penetrates subsurface formation 11. Logging tool or sonde 12 is adapted to pass through the borehole and is positioned in proximity to formation 11. Sonde 12 is connected to the surface by uphole connector 13 and includes, as essential components, neutron source 14, resonant scatterer 15, and gamma ray detecting means 16.

Neutron source 14 provides a flux of fast (high energy) neutrons which are used to irradiate or bombard subsurface formation 11. The neutron source can be plutonium-beryllium, plutonium-americium, radium-beryllium, or any convenient source which produces neutrons of the requisite energy.

Responsive to the neutron bombardment, the various elements making up subsurface formation 11 emit characteristic capture gamma rays. Gamma rays which are returned to sonde 12 are selectively analyzed as described below.

Coincidences in nature result in the emission of gamma rays by certain elements with energies that can be resonantly scattered by certain nuclei, i.e., resonant scatter material. Resonant scatterer 15 is comprised of specially selected resonant scatter material which is able to elastically scatter gamma rays emitted by a preselected element.

The table gives a partial listing of elements which can be determined and suitable resonant scatter materials which can be utilized as targets for gamma rays emitted thereby.

TABLE

| Element to be determined | Emitted gamma ray, Mev | Resonant scatter material | Scatter cross section, mb |
|---|---|---|---|
| Cl | 6.12 | $Pr^{141}$ | 110 |
| Cl | 6.12 | La | 35 |
| Ni | 8.997 | $Sm^{144}$ | 100 |
| Se | 8.496 | Zr | 3,050 |
| K | 7.76 | SE | 90 |
| As | 7.30 | $Bi^{209}$ | 80 |
| Fe | 7.285 | $Pb^{206}$ | 4,100 |
| Cu | 7.16 | Tl | 120 |
| Cu | 7.01 | Sn | 110 |
| Mn | 7.15 | La | 50 |
| Ti | 7.149 | $Bi^{209}$ | 2,000 |
| Co | 6.474 | Cd | 110 |
| Co | 4.903 | Hg | 385 |
| Ag | 6.27 | Sn | 75 |
| Hg | 5.44 | Hg | 75 |
| Cr | 8.499 | Cu | 24 |

FIG. 1 shows resonant scatterer 15 spaced apart from neutron source 14. The greater the separation between them, the greater the average depth of origin for the captured gamma rays, but the lower the over-all count rate. The optimum spacing in each instance is best determined in the field since it depends to some extent on the concentration of the particular element of interest being logged.

Resonant scatterer 15 actually performs two functions. Its primary function is to serve as the resonant scattering target for impinging gamma rays of the requisite energy. In addition to this, it serves to shield gamma ray detecting means 16 against gamma rays approaching from the bottom of sonde 12 which might cause spurious signals. A special gamma ray shield (not shown) may be used to aid resonant scatterer 15 in this latter function.

The purpose of gamma ray detecting means 16 is to detect a portion of the gamma rays scattered by resonant scatterer 15. It follows that the abundance of the element of interest can be ascertained by resonantly scattering its emitted gamma rays and then detecting the scattered gamma rays.

It will be observed that a means for rotating resonant scatterer 15 is included in the basic embodiment. This is shown in FIG. 1 as synchronous motor 17 connected to resonant scatterer 15 by shaft 18. In most instances the cross section of the scatter reaction can be significantly increased by rapidly rotating or spinning resonant scatterer 15 about an axis parallel to the borehole. It may be desired to employ rotational rates of 25,000, 50,000 or even 100,000 rpm.

Figure 2A:
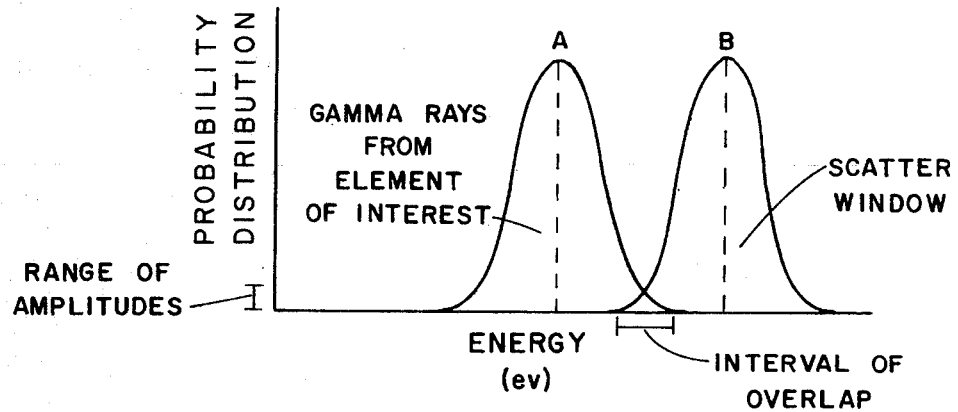

Reference is made to FIG. 2a where probability distribution is plotted against energy for the gamma rays emitted by a hypothetical element of interest (Curve A) and the scatter window of a hypothetical resonant scatter material (Curve B). The cross section of the scattering reaction is proportional to the product of the amplitudes of Curves A and B over their interval of overlap. Hence, the greater the interval of overlap, or the greater the amplitudes of the curves in the overlap interval, the greater the scattering cross section. It would be a most unusual phenomenon if Curves A and B were to fully coincide; rather, the typical situation is as indicated, i.e., the interval of overlap is sufficient to practice the invention but the cross section nowhere approaches the theoretically possible cross section.

By rapidly spinning the resonant scatter material the effective energy of the returned gamma rays is Doppler shifted up or down depending on whether the nuclei comprising the resonant scatter material are moving toward or away from the impinging gamma rays. Thus, the effective energy of the gamma rays as seen by the resonant scatter material is dependent upon the motion of the nuclei of the resonant scatter material relative to the direction of travel of the approaching gamma rays.

Figure 2B:
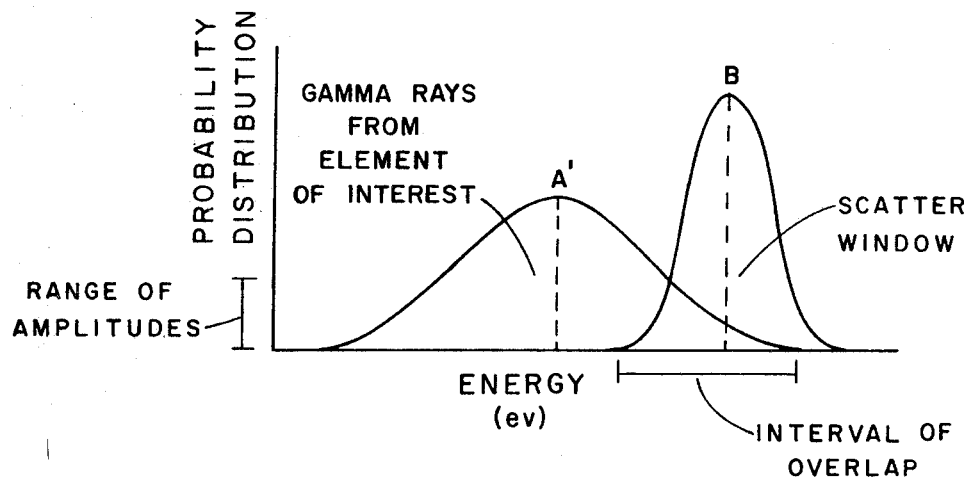

Reference is made to FIG. 2b which shows Curve B in relation to Curve A' (a flattened version of Curve A). Curve A is deformed into Curve A' by rapidly rotating the resonant scatter material so that the impinging gamma rays have an apparent energy distribution which is broader than the distribution defined by Curve A. Because of this broader energy spectrum, the interval of overlap with Curve B is substantially increased, the amplitudes in the overlap interval are larger, and, hence, the cross section of the scattering reaction is greatly increased.

Referring again to FIG. 1, slow neutron shield 19 surrounds resonant scatterer 15 with slow neutron capture material to prevent low energy neutrons, i.e., thermal and epithermal neutrons, from being captured by the resonant scatter material. The probability of neutron capture by resonant scatterer 15 can be further lessened by distributing slow neutron capture material throughout the resonant scatter material. By preventing neutron capture by the resonant scatter material, one assures that few prompt capture gamma rays will be generated by the resonant scatter material and, hence, only scattered gamma rays will approach gamma ray detecting means 16 from the direction of resonant scatterer 15.

Suitable slow neutron capture materials include elements such as boron, lithium, gadolinium, etc., which have relatively large capture cross sections for thermal and epithermal neutrons and produce few high energy gamma rays (which might be mistaken for the scattered gamma rays). Boron and compounds or alloys thereof are preferred by Applicants as slow neutron capture materials.

Figure 3:
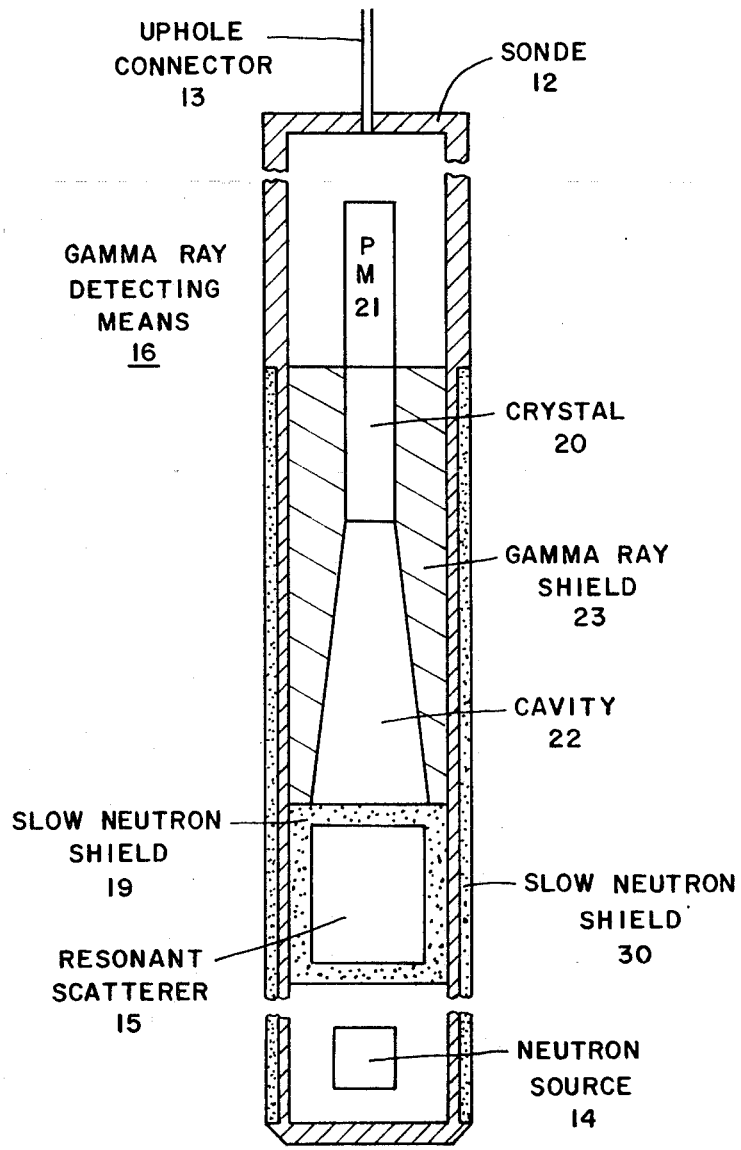
FIG. 3 shows in longitudinal section a logging tool according to a first embodiment of the invention.
Figure 4:
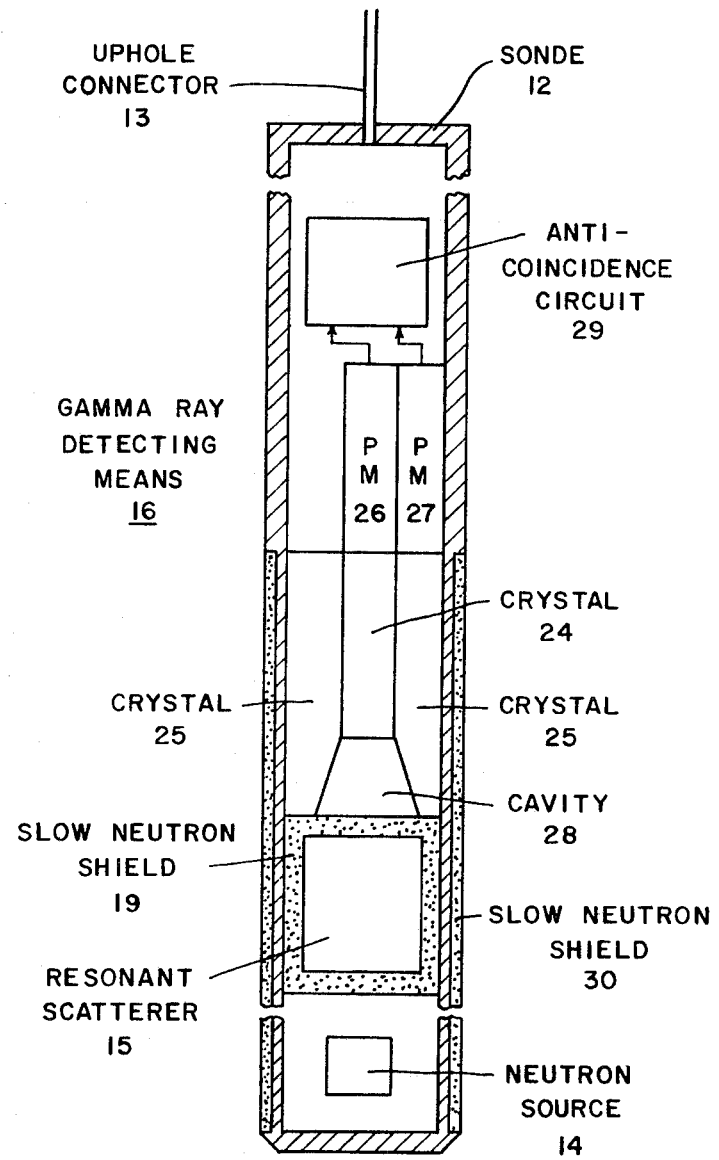
FIG. 4 shows in longitudinal section a logging tool depicting a second embodiment of the invention.

More detailed embodiments of the invention are shown in FIGS. 3 and 4 wherein sonde 12, uphole connector 13, resonant scatterer 15, gamma ray detecting means 16, and slow neutron shield 19 serve the purposes and functions discussed in conjunction with FIG. 1.

Referring first to FIG. 3, gamma ray detecting means 16 is comprised of scintillation material formed as scintillation crystal 20 and photomultiplier 21, which is optically coupled thereto. Resonant scatterer 15 and crystal 20 are separated by cavity 22 which provides an easy pathway for scattered gamma rays through gamma ray shield 23.

By positioning crystal 20 some distance from neutron source 14 error counts due to nonscattered gamma rays approaching crystal 20 from without sonde 12 can be lessened but movement away from the source must be balanced against its adverse effect of reducing the count rate. Gamma rays approaching directly from the subsurface formation are better discriminated against by using an elongated cylindrical crystal, preferably with a height at least twice the length of its diameter. The long crystal path length for the scattered gamma rays will result in a relatively high photopeak detection efficiency, whereas the short path length offered by the crystal diameter to gamma rays approaching directly from the formation being logged will result in a correspondingly low photopeak detection efficiency.

Gamma ray shield 23 is further used to reduce false scatter gamma ray counts. Shield 23 surrounds cavity 22 and extends upward around crystal 20 in order to attenuate gamma rays approaching the scintillation material from the earth formations. It is comprised of gamma ray shielding material such as tungsten, tantalum, uranium, or some other dense metal.

Now, referring to FIG. 4, sonde 12 includes an improved version of gamma ray detecting means 16 whereby gamma rays scattered by resonant scatterer 15 can readily be distinguished from gamma rays approaching from the earth formations.

Gamma ray detecting means 16 is comprised of coaxial scintillation crystals 24 and 25 optically coupled to photomultipliers 26 and 27, respectively. Scattered gamma rays from resonant scatterer 15 pass through cavity 28 and enter central crystal 24 where they are generally absorbed without passing through any part of outer crystal 25. Gamma rays approaching from the earth formations must pass through some portion of outer crystal 25 before reaching central crystal 24. Passage through crystal 25 is ensured by having a portion of the scintillation material protrude downwardly past crystal 24 thereby surrounding cavity 28. By rejecting counts registered by both crystals and accepting counts solely registered by central crystal 24, an accurate reading of the scattered gamma rays is obtained. Therefore, the outputs of photomultipliers 26 and 27 are connected to anticoincidence circuit 29 which accepts signals representing gamma rays detected by central crystal 24 only when no time coincident signal is detected by outer crystal 25.

Referring to FIGS. 3 and 4, slow neutron shield 30 is an external shield comprised of slow neutron capture material such as has already been discussed. Shield 30 should at least laterally surround the resonant scatter material and preferably is included about the scintillation material and neutron source 14. The slow neutron capture material around the resonant scatter material and the scintillation material serves to lessen the likelihood that neutrons will be captured by sonde 12, resonant scatterer 15, etc.; the slow neutron capture material encircling the source serves to improve the average depth of origin of the gamma rays (low energy neutrons are absorbed before they reach the earth formations).

It is to be understood that means for rotating resonant scatterer 15 can be included in the embodiments shown in either FIG. 3 or FIG. 4.

While the invention has been presented in general terms to cover determining any element of interest for which a suitable resonant scatter material can be found, emphasis should be made that the invention has particular utility for petroleum exploration by chlorine logging.

It is intended that the scope of the invention be limited only by the appended claims after due allowance for equivalents.

What is claimed is:

1. A radioactive logging tool adapted to traverse a borehole comprising
   a. a neutron source for irradiating a subsurface formation with fast neutrons,
   b. a resonant scatterer for selectively detecting prompt capture gamma rays emitted by an element of interest in said subsurface formation in response to said fast neutrons, said resonant scatterer comprised of a material selected to have a high cross section for resonantly scattering gamma rays emitted by said element of interest and a low cross section for resonantly scattering gamma rays of other energies,
   c. a scintillation crystal spaced apart from said resonant scatterer for detecting gamma rays resonantly scattered by said resonant scatterer, and
   d. a photomultiplier optically coupled to said scintillation crystal,
   e. said resonant scatterer located intermediate between said neutron source and said gamma ray detecting means.

2. A logging tool according to claim 1 where said resonant scatterer is connected to and rotated by a synchronous motor.

3. A logging tool according to claim 1 where said resonant scatterer is selected from the group of materials consisting of praseodymium and lanthanum.

* * * * *